Figure 10:
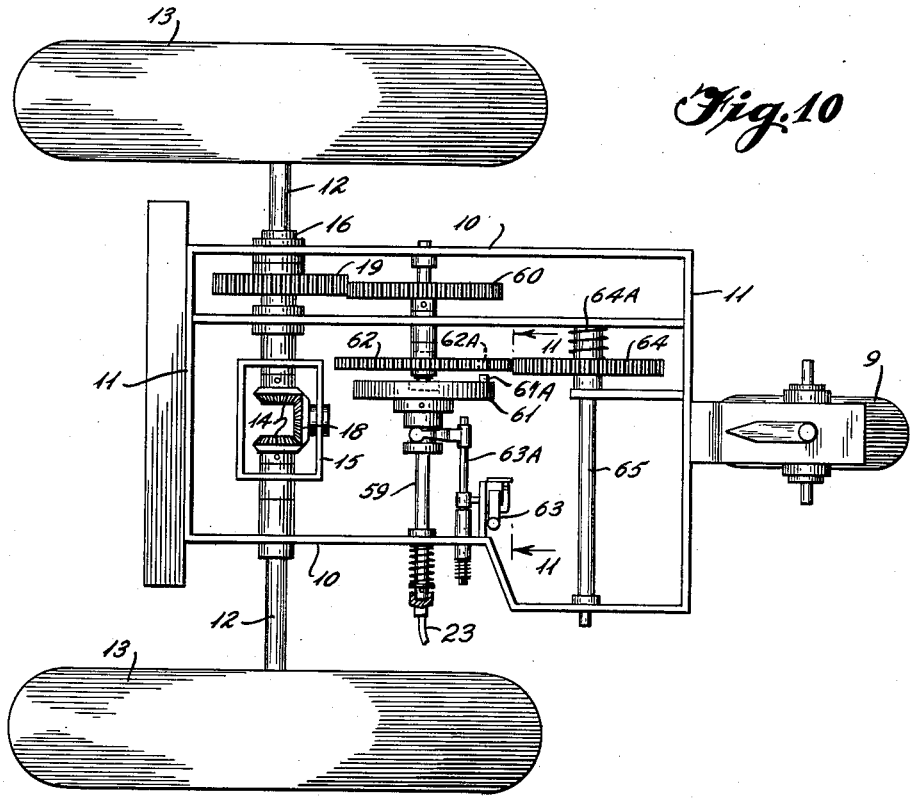

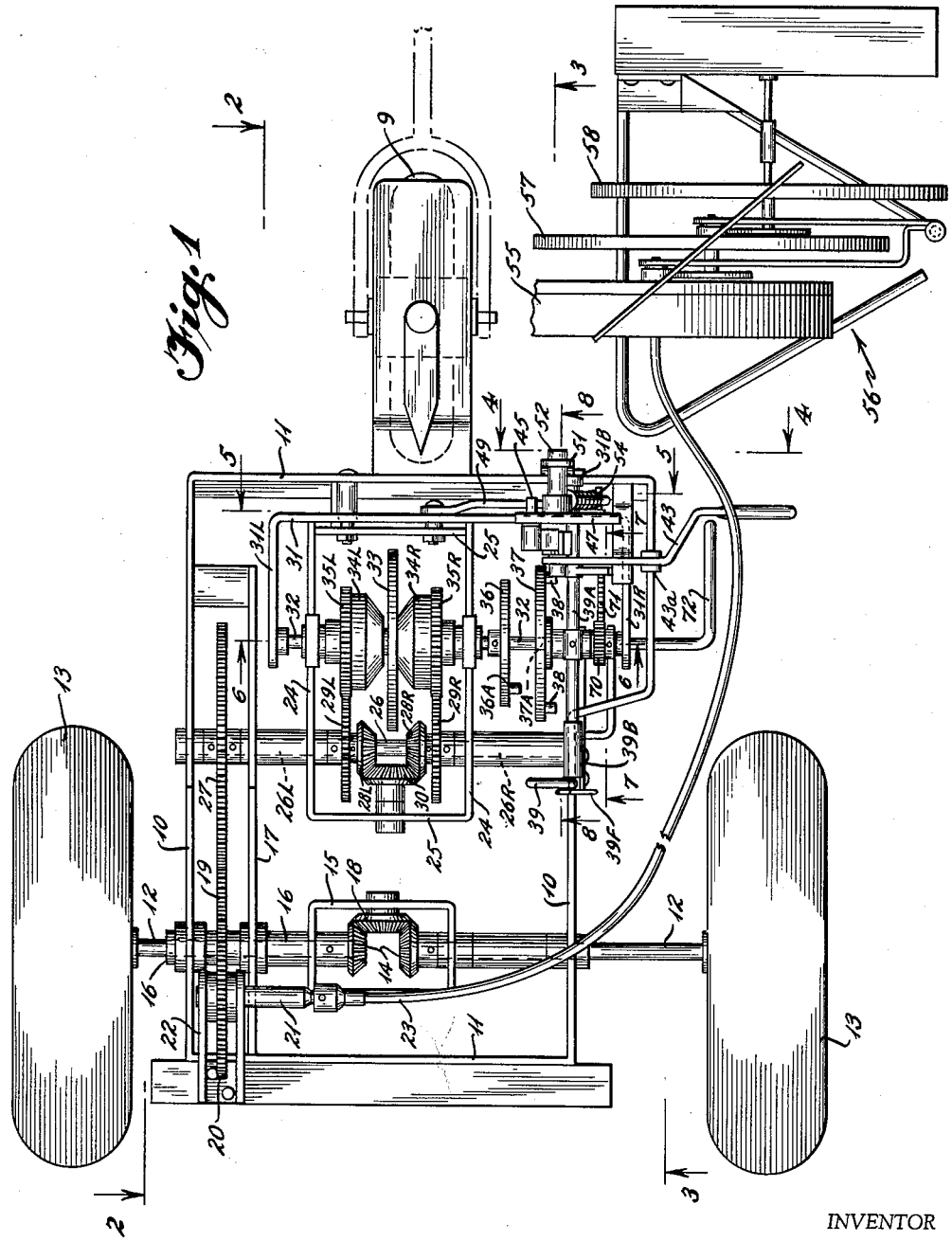

Sept. 24, 1963
R. E. CRUMP
3,104,632
DISTANCE MEASURING DEVICE
Filed Sept. 12, 1961
4 Sheets-Sheet 2
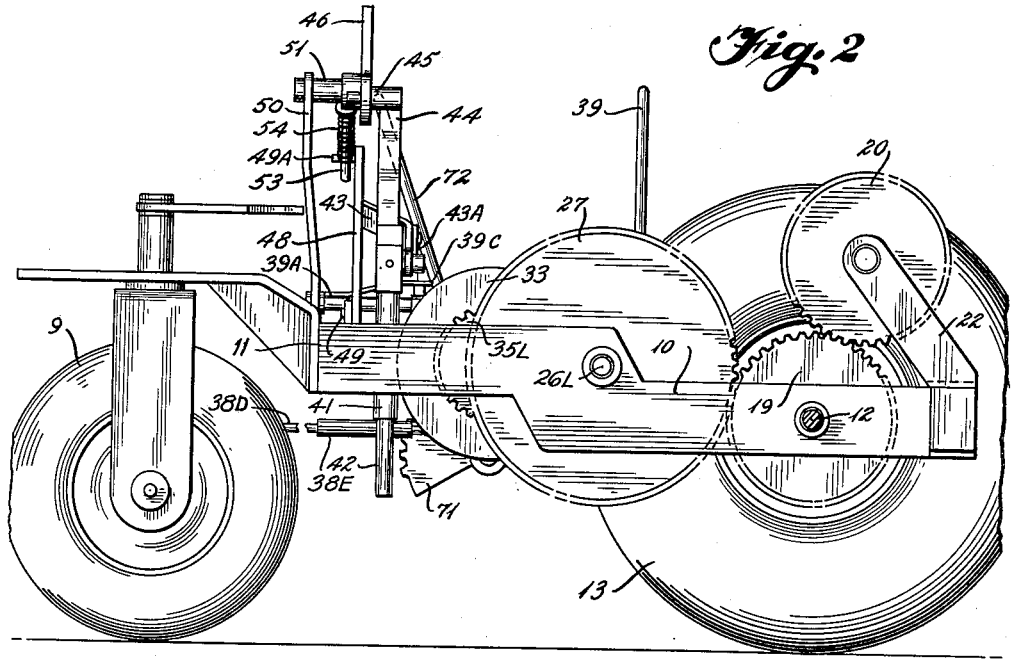
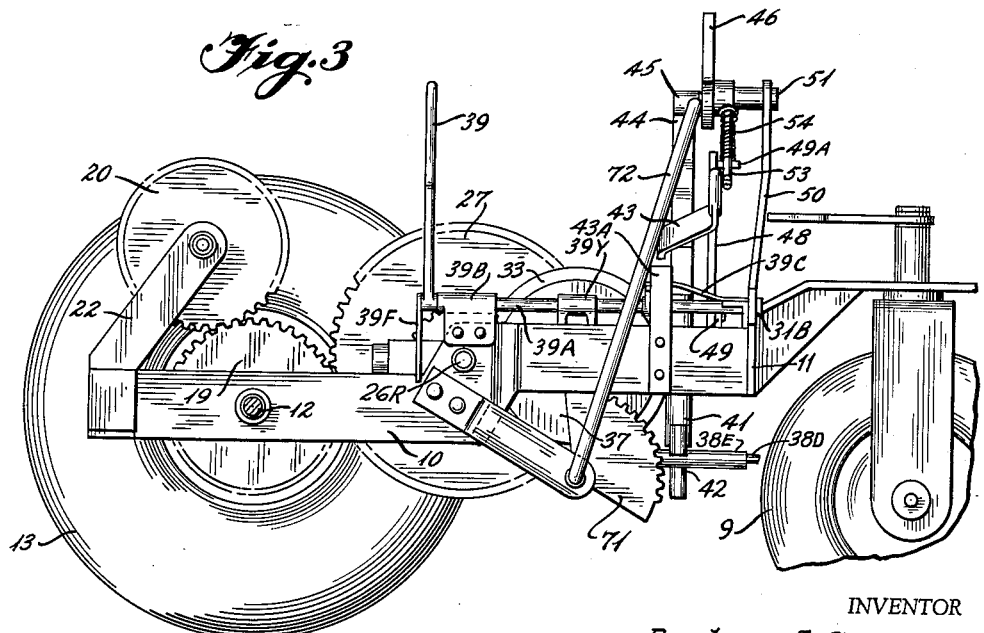
INVENTOR
Rayburn E. Crump
BY
ATTORNEY

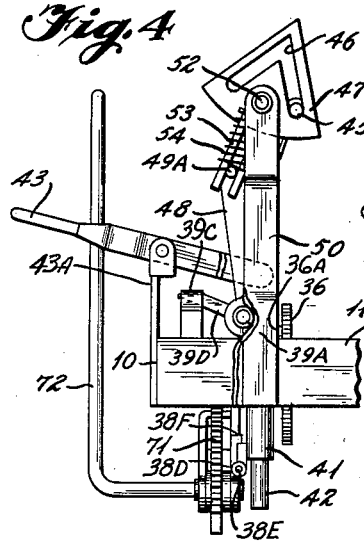
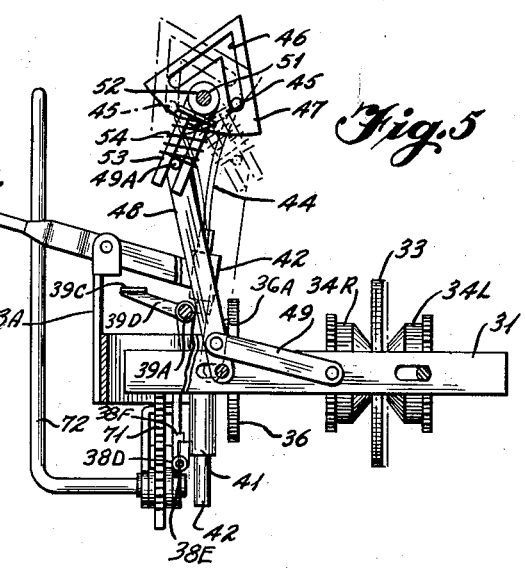
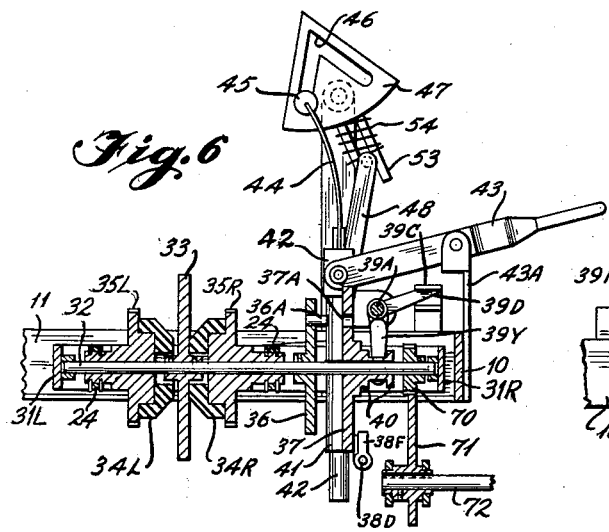
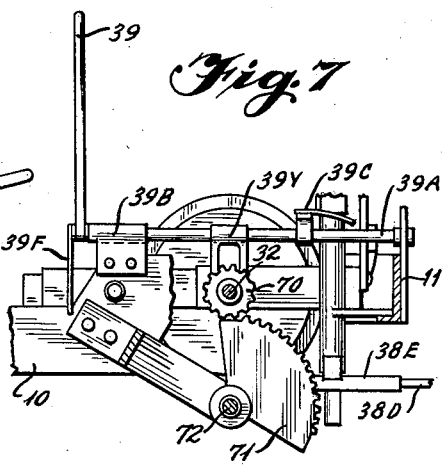
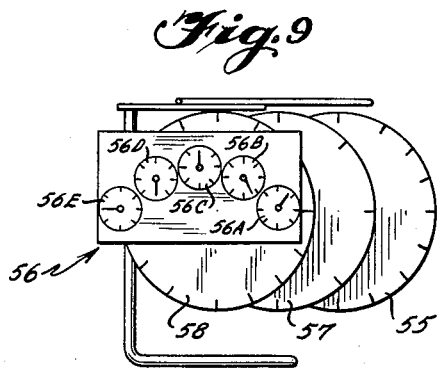
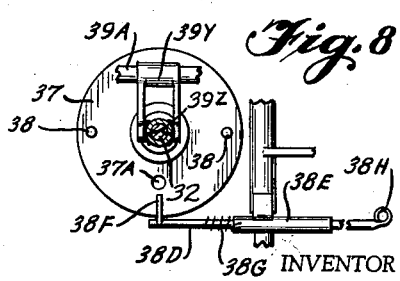
INVENTOR
Rayburn E. Crump Sept. 24, 1963  R. E. CRUMP  3,104,632
DISTANCE MEASURING DEVICE
Filed Sept. 12, 1961  4 Sheets-Sheet 4

INVENTOR
Rayburn E. Crump
BY
ATTORNEY

3,104,632
DISTANCE MEASURING DEVICE
Rayburn E. Crump, 1008 Locust St., Columbia, Mo.
Filed Sept. 12, 1961, Ser. No. 139,036
4 Claims. (Cl. 111—1)

The present invention relates to a device for measuring distances on a surface and provides for accurate checking of such distances by repeating the measurement in a return traverse of the measuring device on the surface being measured. Heretofore various types of distance measuring devices including surface engaging wheels have been used, but they have not been entirely satisfactory since they were not self-checking for all uses.

An object of the present invention is to provide a measuring device which may be drawn over a field in one traverse and returned on the path of the same for checking the accuracy of the measurement.

Another object is to provide a distance measuring device which can be used to measure distances or can be attached to a corn-planter or seeder for accurately dropping seeds at the desired distances.

A further object is to provide a distance measuring device which compensates for a turn to accurately check the distance.

Other and further objects will be apparent as the description proceeds and upon reference to the accompanying drawings wherein:

FIG. 1 is a plan view of the distance measuring and checking device showing the tricycle supported chassis therefor and showing the distance recording register separated from the chassis for simplifying the illustration thereof and showing the flexible drive shaft connection from the reigster to the wheels of the tricycle permitting mounting of the register on the chassis or on a separate support such as a tractor which draws the measuring device over the ground.

Figure 11:
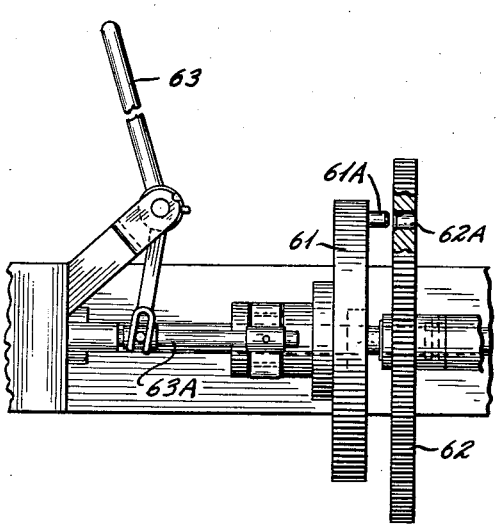

FIG. 2, a left side elevation of the measuring device taken on section line 2—2 of FIG. 1 through the axle with the left wheel omitted and showing the gearing connection;

FIG. 3, a right side elevation of the measuring device taken on section line 2—2 of FIG. 1 with the right wheel omitted;

FIG. 4, a fragmentary front elevation showing the lever system for operating the reversing shaft and taken substantially on line 4—4 of FIGURE 1;

FIG. 5, a similar view taken substantially on line 5—5 of FIGURE 1 with the parts in the same general relation and showing the reversing clutch;

FIG. 6, a vertical section taken substantially on line 6—6 of FIGURE 1 through the axis of the clutch driven reversing shaft which shaft is axially moved by a yoke frame;

FIG. 7, a section taken substantially on line 7—7 of FIG. 1 transverse to the reversing shaft and showing the segmental gear arrangement for indexing such reversing shaft;

FIG. 8, a fragmentary detail taken substantially on line 8—8 showing the kick-drop for timing the dropping of seeds by a planter;

FIG. 9, a front view of the register showing the dials for measuring distance in inches, feet, yards, and rods;

FIG. 10, a plan view of a modified form of measuring device which omits the reversing mechanism;

FIG. 11, a fragmentary detail taken substantially on line 11—11 of FIGURE 10 showing the arrangement for positively clutching the gear drive to a driven shaft which driven shaft may operate the timing mechanism of a corn planter and/or the flexible shaft of a recorder.

Briefly, the invention includes a main frame or chassis supported on three wheels in a tricycle arrangement with the two rear wheels being mounted on axles connected by differential gears supported on a spider or differential case drivingly connected to a ring gear meshing with a gear directly connected to a measuring or counting register.

An auxiliary chassis mounted on the main chassis rotatably supports shaft means which carry a gear meshing with the ring gear connected to the differential case and such shaft means also carries a pair of bevel gears which mesh with a third bevel gear rotatably mounted on the auxiliary chassis whereby the first and second bevel gear rotate in opposite directions. Fixedly connected to the first and second bevel gears are spur gears. A yoke carrying a reversing shaft substantially parallel to the axles and said first shaft means is slidable in an axial direction of said shaft means. Fixed on the yoke shaft is a driven clutch element and freely rotatable on said yoke shaft are a pair of spur gears meshing with the pair of spur gears fixed with respect to said bevel gears on said first shaft means. Each spur gear on the yoke shaft has a cone shaped resilient driving clutch element fixed thereon for driving connection to the driven clutch element fixed to the reversing yoke shaft. Lever means are provided for moving the yoke and thereby the reversing shaft axially to cause driving engagement between one or the other of said driving clutch elements and said driven clutch element. A disk having a projection is fixedly mounted on the reversing shaft while a second disk having a recess for reception of the projection on said first disk is freely rotatable on said reversing shaft, but such second disk is provided with means to frictionally retain said second disk against rotation relative to said yoke frame. A lever arrangement on said yoke frame is provided for producing relative movement of said second disk with respect to said first disk for selective driving engagement. A system of levers is provided for moving the yoke in a direction axially of the reversing shaft for retaining the driving relation between one of the driving clutch elements and the driven clutch element.

Referring more particularly to the drawings the measuring device of the present invention includes a main chassis having side frame members 10 and end frame members 11 with a pair of axles 12 rotatably mounted in the side frame members and carrying ground engaging wheels 13 for supporting the device for movement over a supporting surface. A steerable front wheel 9 is mounted on a pivoted fork to complete the wheel support of the device. A differential gear 14 is fixed to the inner end of each axle and a differential spider case 15 having a tubular member 16 fixed thereto is rotatably mounted on the axles 12 and also rotatable in another frame member 17. A bevel gear 18 is rotatably mounted on the differential case 15 and meshes with bevel differential gears 14, 14 in the well known manner of the differential. The tubular member 16 rotates with the spider 15 and has a ring gear 19 fixed on member 16 and meshing with a gear 20 fixed to a shaft 21 rotatably mounted in frame member 17 and a frame member 22. Gear 20 is connected by its shaft 21 to a flexible shaft 23 which is connected to a counting device or register 56 for measuring the number of rotations of the gear 20 and thereby the distance of travel of the device over the supporting surface as measured by the rotation of the wheels 13.

An auxiliary chassis including frame members 24 on the sides thereof and frame members 25 at the ends thereof rotatably support shaft means 26 which may be a single continuous shaft or separate shafts. A driving gear 27 is fixed to the left shaft section 26L of shaft 26 and meshes with the driving gear 19 on the tubular shaft 16 for continuous rotation therewith. A first bevel gear 28L on the shaft means 26L is fixed to a first spur gear 29L on the shaft 26L for simultaneous rotation with gear 27 while bevel gear 28R is fixed with relation to spur gear 29R and bevel gear 28R and spur gear 29R may be freely rotatable on the shaft means 26 whether such shaft is continuous or such shaft includes a separate right section 26R. A bevel gear 30 is mounted for rotation on a fixed axis on the auxiliary chassis whereby rotation of a bevel gear 28L in one direction causes reverse rotation of bevel gear 28R. A yoke including the side members 31L, 31R and a connecting bight portion 31 rotatably supports a reversing shaft 32 which can be reversibly driven in either direction, and the yoke 31 is mounted on the main chassis for movement in the axial direction of reversing shaft 32 causing reversing shaft 32 to move axially with yoke. Fixed on the reversing shaft 32 is a driven clutch element 33 and freely rotatable on such reversing shaft 32 are driving clutch elements 34L and 34R which are fixedly connected to spur gears 35L, 35R, respectively meshing with spur gears 29L, 29R, respectively.

The clutch elements 34L and 34R are generally cone shaped and are made of resilient material such as rubber so that when the shaft 32 carrying the driven clutch element 33 is moved axially the driven clutch element 33 will engage the corresponding conical shaped resilient rubber like cone shaped driving clutch element 34L or 34R and thereby be driven in one direction or in the other direction.

A first disk 36 having a lateral projection 36A is fixed to the shaft 32 while a disk 37 is freely rotatable on shaft 32 and is normally prevented from rotation by a spring (not shown) or projections 38 on disk 37 reacting between the yoke 31 or a portion of the frame and the disk 37. Disk 37 is provided with a recess 37A which receives the projection 36A of the disk 36 when the disk 37 is moved axially on reversing shaft 32. This axial movement of the disk 37 is accomplished by a lever 39, fixed to a shaft 39A rotatably mounted in bearings 39B on the chassis. A forked yoke lever 39Y fixed to shaft 39A and extending between collars 40 fixed to disk 37 causes sliding movement of disk 37 upon pivotal movement of lever 39.

There are provided friction portions 39Z on the yoke 39Y which normally frictionally prevent rotation of the disk 37 except when the pin 36A is received in recess 37A. Other means to prevent rotation can be additionally and/or alternatively provided. A suitable spring latch means 39C operating against cam 39D fixed to shaft 39A is provided to retain the lever 39 in one position and a spring latch 39F engaging side frame member 10 retains the lever in the other position for driving engagement and release between discs 36 and 37.

The projections 38 cooperate with a kick drop which includes a rod 38D slidable and oscillatable in a tubular guide 38E fixed to the chassis of the machine and a lateral projection 38F lies in the path of pins 38 of disk 37 to be moved against the bias of spring 38G to positively move the kick drop which is connected by its eye 38H to a seeder planter to drop seeds at the correct spacing determined by the driving train.

As stated above, the yoke 31 and the reversing shaft 32 are movably mounted for axial movement relative to the main chassis and such axial movement of shaft 32 and yoke 31 is accomplished by a lever system. A sleeve 41 mounted in upright position supported from the front cross-member 11 slidably carries a rod 42 which is movable in a vertical direction by a lever 43 pivoted to the rod 42 projecting from the main chassis, the rod 42 carries cam follower pin 45 mounted on the spring extension 44 thereof for cooperation with a cam slot 46 in a cam plate 47. A second lever 48 pivotally mounted on the main chassis is connected by a link 49 to the yoke 31 for causing axial movement of such yoke upon movement of lever 48. The lever 48 carries a projecting pin 49A which terminates short of the cam 47.

A support bar 50 generally parallel to slidable rod 42 is mounted on the main chassis and carries a tubular bearing 51 at the upper end thereof which tubular bearing receives a cam-supporting pin 52 fixed to the cam plate 47, thereby providing a pivoted mounting for the cam plate which is retained in position between the rod 42 with its leaf spring 44 and the support bar 50 retaining the cam follower 45 of the rod in the cam slot 46. A fork 53 is fixed by its stem to the cam plate supporting pin 52 and straddles pin 49A on lever 48 while a spring 54 surrounding the fork 53 produces a force reacting between the cam-supporting pin 52 and the pin 49A whereby a spring bias is applied to the lever 48 to link 49 to urge the yoke 31 in one or the other axial direction with sufficient resilient force to cause clutching engagement between driven clutch element 33 and driving clutch elements 34L or 34R to maintain a non slipping driving relation.

The lever 48 is moved from one position to the other by the lever 43 which axially moves shaft 42 and the flexible spring 44 which carries the cam follower pin 45 whereby the raising of shaft 42 causes the cam follower pin 45 to be moved to the apex of V slot 46 in a cam plate 47. The spring leaf 44 in its natural state is in axial alignment with the axis of shaft 42 and therefore when the pin 45 projects into the apex of the cam slot 46 the pin 45 tends to move into the other leg of the slot and downward movement of the shaft 42 by the lever 43 causes the cam plate 47 to oscillate about the cam supporting pin 52 to the other position of the cam supporting plate 47 thereby causing movement of the lever 48 to the other position. Consequently, operation of the lever 43 causes a change of position of lever 48 and thereby of yoke 31 causing change of direction of rotation of the shaft 32.

The size of the wheels 13 and gears 19 and 20 are such that a disk 55 on the recording device 56 rotates at the same angular rate as gear 20 and shaft 23 making one revolution for each foot of travel and such disk 55 is divided into twelve one inch divisions. A second disk 57 is geared to disk 55 to make one revolution for each yard, and the third disk 58 is geared to make one revolution for each rod. Registering hands 56A, 56B, 56C, 56D, and 56E indicate the number of rods in tens, hundreds, thousands, ten thousands, and hundred thousands respectively.

In actual use, the device is moved over a field with the ground engaging wheels 13 rotating due to the movement of the measuring device over the field, and such motion causes registering of the distance on the register 56. At the time of starting, the pin 36A on disk 36 is arranged to be in registration with the opening 37A on disk 37 and the disk 37 is moved out of engagement with pin 36A. The device is then moved in a first traverse the length of the field and the actual measurement read on the register 56. During the first traverse of the field, the lever 48 is at one limit of its movement, such as the limit of its movement to the right, as shown in FIG. 6 thereby causing the driving action between clutch elements 34R and element 33 thereby causing rotation of disk 36 on the shaft 32. After one complete traverse of the field, the device is turned and precisely at the end of its traverse at the instant the device is changed in direction about a vertical center through the center of axles 12, the lever 48 is moved from the right to the left, by manual operation of lever 43, to the dotted line position of FIG. 5 thereby causing clutch element 34L to be engaged by clutch element 33 causing reverse rotation of clutch element 33 and of shaft 32, and the return traverse is completed to the stopping point. From the recording on the register it can be determined whether the distance is the same, and the precise accuracy can be determined by inspection of the location of projection 36A with respect to the recess 37A. If perfect registry is found to exist, and the measurements according to the register 56 indicated the same length in the first and the return traverse. The person using the equipment then can be assured that the accurate length of the field is known, and the reading on the register will then be twice the length of the field.

A modification of the invention is shown in FIG. 10 wherein similar parts are identified by the same reference numerals where applicable, but it will be noted that shafts 32 and 26 have been replaced by a single shaft 59, which is slidably mounted in the main frame or chassis, and carries a driving gear 60 fixed thereon which meshes with gear 19 on the differential spider. A disk 61 fixed on shaft 59 has a projection or lug 61A which may project into a recess 62A in a gear 62 which is freely rotatable on shaft 59 and meshes with a gear 64 fixed to shaft 65 which is freely rotatable in suitable bearings but is normally held frictionally against rotation by a spring 64A reacting between gear 64 and the main chassis. Disk 61 and the shaft 59 are axially movable by a lever 63 pivoted to the main frame and having a portion of the lever operative to slide yoke rod 63A to axially move disk 61 and shaft 59 to cause driving engagement between the disk 61 and gear 62.

The shaft 65 may be operatively connected to a corn planter or the like and may operate a disk similar to disk 37 to cause seeds to be deposited in accordance with mechanism operated by lugs 38. The shaft may be connected to a corn planter or seeder to indicate the distance for accurate spacing of seeds during the planting thereof or checking on the spacing of the seeds after the planting. In any event, the apparatus disclosed in the application is adaptable to accurately measure distances by the register 56 and to assure that accurate measurement has been done, the comparison between the final location of the pin 36A and recess 37A on the disks 36 and 37 respectively and 62 provides for this additional check.

Since the shaft 59 shown in FIG. 10 operates continuously with the rotation of the wheels 13, the flexible shaft 23 of the register may be connected to shaft 59 to be driven by said shaft 59 to operate the register.

For setting the reversing shaft 32 to provide for registry between the projection 36A of disk 36 and the recess 37A of disc 37 the means shown in FIG. 3 are provided. This structure includes a gear 70 fixed to reversing shaft 32 and a segmental gear 71 fixed to a shaft pivoted on a support on the main chassis and operated by a lever 72 fixed to the shaft carrying the segmental gear which causes rotation of gear 70 thereby causing rotation of gear 70 and shaft 32 and the disk 36 until the projection 36A on disk 36 is in registry with recess 37A of disc 37, this registration assures proper relative angular position of the discs for the precise starting and/or finishing position, for accurate duplication of a measurement. The disk 37 is moved axially by means of the lever 39 shaft 39A and yoke 39Y as previously described when it is desired to have the disk 37 rotate with disk 36 and/or be prevented from rotation therewith.

What is claimed is:

1. A device for measuring and checking the distance comprising a main chassis, a pair of axles arranged in alignment and rotatably mounted on said chassis, a ground engaging wheel fixed on the outer end of each axle, a differential gear fixed on the inner end of each axle, a differential spider case rotatably mounted on said axles, a gear rotatably mounted on said differential spider case meshing with said differential gears, a tubular extension member fixed on said differential case and rotatably receiving one axle, a frame member on said chassis rotatably supporting said tubular member, a gear fixed on said tubular member for rotation with said tubular member and said differential case, a shaft rotatably mounted on said chassis, a first gear mounted on said shaft and meshing with said gear on said tubular member, means connected to said first gear for counting the number of rotations of said first gear and thereby indicating the distance over which the measuring device passes, an auxiliary chassis mounted on said main chassis, shaft means substantially parallel to the axles rotatably mounted on said main and auxiliary chassis, a driving gear fixed to said shaft means and meshing with said gear on said tubular member extending from said differential case, a first bevel gear on said shaft means, a second bevel gear spaced from said first bevel gear and rotatably mounted on said shaft means, a third bevel gear rotatably mounted on said auxiliary chassis and meshing with said first and second bevel gears on said shaft means whereby one bevel gear rotates in one direction while the other bevel gear rotates in the other direction, a spur gear fixed to each bevel gear, a yoke, a reversing shaft substantially parallel to said axles and shaft means rotatably mounted on said yoke and said auxiliary chassis, a driven clutch element fixed to said reversing shaft, a driving clutch element freely rotatably mounted on said reversing shaft on each side of said driven clutch element whereby the driven clutch element may move axially with said yoke and reversing shaft to cause selective engagement with either of said driving clutch elements, a first disk having an axial projection and fixed on said reversing shaft, a second disk having a recess for reception of the projection on said first disk and freely rotatably mounted on said reversing shaft whereby said second disk may rotate with said first disc when said projection on said first disk is in the recess on said second disk, friction means reacting between said yoke and said second disk for normally maintaining said second disk against rotation while permitting said second disk to rotate when the projection of said first disk is in engagement with the recess of said second disk, a grooved collar on said second disk, means to axially move said collar and disk relative to said yoke to selectively cause engagement of said recess on the second disk with said projection on said first disk, a sleeve mounted on said main chassis, a rod slidably mounted in said sleeve, a cam follower pin on said rod, a first lever mounted on said main chassis and connected to said rod for raising and lowering said rod, a second lever pivotally mounted on said main chassis and generally parallel to said rod and spaced therefrom, a link connecting said second lever and said yoke whereby pivotal movement of said second lever will cause movement of said yoke and reversing shaft in an axial direction of said reversing shaft, a support-bar mounted on said chassis in generally parallel relation to said rod and second lever, a tubular bearing mounted on the free end of said support bar and extending laterally from said third lever toward said rod, a cam plate having a closed inverted V-shaped slot, a cam supporting pin fixed to said cam plate and received in the tubular bearing on said support bar, said cam slot receiving the cam follower pin on said rod, a pin on said second lever spaced from the pin on said support bar, a fork fixed on said cam supporting pin and straddling the pin on said second lever, spring means reacting between said cam supporting pin and the pin on the second lever whereby a spring bias will be maintained on said second lever and said yoke in either position to maintain said driven clutch element in engagement with one of said driving clutch elements.

2. Apparatus for accurately measuring distances comprising a vehicle having a pair of wheels mounted on individual axles, a differential gear means including a spider connecting the axles, a gear on said spider driven by said differential gear means, a shaft rotatably mounted on the vehicle and having a gear meshing with the gear on the differential spider, whereby said shaft rotates at a definite rate with respect to the axle, means to measure the number of rotations of the shaft, a pair of selectively engageable members on said shaft, one of said members being fixed on said shaft and the other member being rotatable thereon, and friction means to fix one of said members from rotation when not so engaged to indicate the registry of precise rotation of the shaft whereby the vehicle may be moved in a traverse in the opposite direction to check the same distance whereby an accurate measurement and check can be made.

3. A device for operating a corn planter comprising a vehicle for movement along the ground, ground engaging means supporting said vehicle, means for measuring the distance said vehicle moves, a driven shaft mounted on said vehicle, gearing connecting said driven shaft to said ground engaging means for operation when the vehicle moves along the ground, a selectively driven disk on said driven shaft, a pair of diametrically opposed projections on said driven disk, a driving disk nonrotatably mounted on said shaft, a lug on one of said disks, a cooperating opening in the other disk to receive said lug, means for moving said disks into and out of driving relation with each other, a guiding tube extending transversely of and offset from said driven shaft and adjacent the projections on said driven disc, a kick off rod slidably mounted in said guiding tube and having a laterally offset projection engaging member lying in the path of the projections on said disk, means to urge said rod in one direction, said rod being movable in the opposite direction upon engagement with the projections of said disk, and means to connect said rod to a corn planter to cause corn seeds to be dropped at selected intervals in accordance with the movement of said vehicle over the ground, said device serving selectively to measure distances or to distribute seeds 4. A distance measuring device useable for accurately measuring distance and checking the accuracy thereof by repeating the traverse, comprising a vehicle having a pair of ground engaging wheels, a frame, a pair of axles rotatably mounted on said frame with one axle fixed to one wheel and the other axle fixed to the other wheel, differential gear means including a spider connecting said axles, a gear fixed to said spider, a shaft rotatably mounted on said frame, a gear mounted on said shaft and meshing with the gear on said spider, a freely rotatable disk on said shaft, a cooperating disk fixed on said shaft, positive interengaging means between said disks, means to move one of said disks into driving relation with the other of said disks, and means to drive a recording mechanism from said shaft whereby rotation of said wheels will cause operation of said distance measuring device and the operator can determine whether a repeat traverse is identical in measurement to the original traverse by knowing the position of the interengaging means between said disks.

References Cited in the file of this patent
UNITED STATES PATENTS

| | | |
|---|---|---|
| 408,378 | Cummings | Aug. 6, 1889 |
| 591,761 | Hart | Oct. 12, 1897 |
| 825,295 | Blanchard | July 10, 1906 |
| 1,109,667 | Dikeman | Sept. 8, 1914 |
| 2,159,915 | Van Wagenen | May 23, 1939 |
| 2,524,385 | Hyland | Oct. 3, 1950 |
| 2,637,263 | Schmitz | May 5, 1953 |
| 2,772,832 | Lassiter | Dec. 4, 1956 |